(12) United States Patent
Huang et al.

(10) Patent No.: US 8,631,163 B1
(45) Date of Patent: Jan. 14, 2014

(54) AUTOMATIC CONNECTIVITY DETERMINER AND CONFIGURATOR

(75) Inventors: Yuming Huang, Aurora, IL (US); Suresh W G Kumar, Naperville, IL (US); David J. Peto, Naperville, IL (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1818 days.

(21) Appl. No.: 10/733,692

(22) Filed: Dec. 11, 2003

(51) Int. Cl.
*G06F 15/16* (2006.01)
*G06F 15/177* (2006.01)
*G06F 15/173* (2006.01)

(52) U.S. Cl.
USPC ........... 709/250; 709/220; 709/221; 709/222; 709/223; 709/225; 709/226

(58) Field of Classification Search
None
See application file for complete search history.

(56) References Cited

U.S. PATENT DOCUMENTS

| | | | | |
|---|---|---|---|---|
| 5,497,460 A | * | 3/1996 | Bailey et al. | 714/39 |
| 5,655,148 A | * | 8/1997 | Richman et al. | 710/8 |
| 5,978,912 A | | 11/1999 | Rakavy | |
| 5,987,611 A | | 11/1999 | Freund | |
| 6,052,733 A | * | 4/2000 | Mahalingam et al. | 709/235 |
| 6,487,608 B2 | * | 11/2002 | Gifford et al. | 710/8 |
| 6,493,751 B1 | | 12/2002 | Tate | |
| 6,504,851 B1 | * | 1/2003 | Abler et al. | 370/466 |
| 6,629,145 B1 | | 9/2003 | Pham | |
| 6,708,229 B2 | * | 3/2004 | Awasthi et al. | 710/8 |
| 6,750,879 B2 | * | 6/2004 | Sandberg | 715/714 |
| 6,883,118 B2 | * | 4/2005 | Morgan et al. | 714/43 |
| 6,954,714 B2 | * | 10/2005 | Suzuki et al. | 702/182 |
| 7,051,087 B1 | * | 5/2006 | Bahl et al. | 709/220 |
| 7,131,031 B2 | * | 10/2006 | Brundridge et al. | 714/25 |
| 7,257,741 B1 | * | 8/2007 | Palenik et al. | 714/43 |
| 7,266,818 B2 | * | 9/2007 | Pike et al. | 717/176 |
| 7,321,561 B2 | * | 1/2008 | Lakshminarasimha et al. | 370/252 |
| 2002/0122050 A1 | * | 9/2002 | Sandberg | 345/705 |
| 2003/0110288 A1 | | 6/2003 | Ramanujan | |
| 2003/0142641 A1 | * | 7/2003 | Sumner et al. | 370/328 |
| 2004/0078708 A1 | * | 4/2004 | Li et al. | 714/43 |

* cited by examiner

*Primary Examiner* — Thu Nguyen
*Assistant Examiner* — Angela Widhalm
(74) *Attorney, Agent, or Firm* — Akerman LLP; Michael K. Dixon; Roy P. Zachariah, Jr.

(57) ABSTRACT

Certain exemplary embodiments can comprise a method comprising for a given information device, automatically identifying each installed network interface card (NIC) that is compatible with accessing a predetermined network. Certain exemplary embodiments can comprise automatically determining that a connection can not be achieved via a selected compatible NIC to a server on the predetermined network. Certain exemplary embodiments can comprise automatically trouble-shooting the selected compatible NIC.

19 Claims, 3 Drawing Sheets

AUTOMATIC CONNECTIVITY DETERMINER AND CONFIGURATOR

BACKGROUND

U.S. Pat. No. 6,629,145 (Pham), which is incorporated by reference herein in its entirety, allegedly cites that a "server appliance self-adaptively configures to the operating parameters of a communications network to enable remote configuration control exclusively via the communications network. The server appliance includes a host computer system including a network interface controller and an operating system, executable by the host computer system, that is configurable by a defined set of network values for transmitting and receiving data packets through the network interface controller without network configuration conflicts. A control program, executable by the host computer system in conjunction with the operating system, determines, on initial start-up and specifically with respect to the communications network, an initial set of network values to configure the operating system. The control program is subsequently responsive to a first broadcast data packet containing network configuration parameters that are used to determine and apply a second set of network values to configure the operating system, which are then applied as the operating configuration of the operating system with respect to the network." See Abstract.

U.S. Pat. No. 6,493,751 (Tate), which is incorporated by reference herein in its entirety, allegedly cites that a "mobile configuration manager application is provided for managing network configuration parameters essential for the configuration of a computer for operable interaction in a local area network (LAN) or wide area network (WAN) environment. The network configuration parameters are partitioned into intuitive profiles that may be re-used in additional network configurations including LAN and WAN environments. The population of the profile parameters is facilitated by the application through the use of intuitive menus and windows with competed configurations being stored and selectively activated by a user without requiring subsequent parametric input by the user when selecting a different network environment. The transfer and exchange of network configuration parameters between different computers is also presented." See Abstract.

U.S. Pat. No. 5,987,611 (Freund), which is incorporated by reference herein in its entirety, allegedly cites that a "computing environment with methods for monitoring access to an open network, such as a WAN or the Internet, is described. The system includes one or more clients, each operating applications or processes (e.g., Netscape Navigator™ or Microsoft Internet Explorer™ browser software) requiring Internet (or other open network) access (e.g., an Internet connection to one or more Web servers). Client-based monitoring and filtering of access is provided in conjunction with a centralized enforcement supervisor. The supervisor maintains access rules for the client-based filtering and verifies the existence and proper operation of the client-based filter application. Access rules which can be defined can specify criteria such as total time a user can be connected to the Internet (e.g., per day, week, month, or the like), time a user can interactively use the Internet (e.g., per day, week, month, or the like), a list of applications or application versions that a user can or cannot use in order to access the Internet, a list of URLs (or WAN addresses) that a user application can (or cannot) access, a list of protocols or protocol components (such as Java Script™) that a user application can or cannot use, and rules to determine what events should be logged (including how long are logs to be kept). By intercepting process loading and unloading and keeping a list of currently-active processes, each client process can be checked for various characteristics, including checking executable names, version numbers, executable file checksums, version header details, configuration settings, and the like. With this information, the system can determine if a particular process in question should have access to the Internet and what kind of access (i.e., protocols, Internet addresses, time limitations, and the like) is permissible for the given specific user." See Abstract.

U.S. Pat. No. 5,978,912 (Rakavy), which is incorporated by reference herein in its entirety, allegedly cites that a "method and system of communicating with a computer through a network prior to booting the computer's operating system or after operating system failure is provided. A multitasking kernel is implemented in a network enhanced BIOS. External references in a NIC device driver are resolved to reference services provided by the network enhanced BIOS. A workstation coupled to the computer through a network may be used to access and set status on the computer prior to loading the operating system or after operating system failure. The multitasking kernel may be operated simultaneously with a conventional BIOS. The computer may be further provided with a means for alerting the workstation in the event of a POST failure or operating system crash." See Abstract.

United States Patent Application 20030110288 (Ramanujan), which is incorporated by reference herein in its entirety, allegedly cites that "Automated techniques are described that provide continuous, uninterrupted operation of the secure packet tunnels in spite of access link flooding attacks. A system is described that includes a source device and a destination device coupled to a network. The source and destination devices may comprise, for example, edge routers that couple local area networks to the network via access links. The source device and the destination device establish a packet tunnel that has a source network address and a destination network address. Upon detecting a network attack, the destination device selects a new network address for at least one of the source network address and the destination network address and establishes a new packet tunnel with the source device. The source network address and the destination network address may comprise port numbers, Internet Protocol (IP) addresses, or other information describing the source and destination devices." See Abstract.

SUMMARY

Certain exemplary embodiments can comprise a method comprising for a given information device, automatically identifying each installed network interface card (NIC) that is compatible with accessing a predetermined network. Certain exemplary embodiments can comprise automatically determining that a connection can not be achieved via a selected compatible NIC to a server on the predetermined network. Certain exemplary embodiments can comprise automatically trouble-shooting the selected compatible NIC.

BRIEF DESCRIPTION OF THE DRAWINGS

A wide variety of potential embodiments will be more readily understood through the following detailed description, with reference to the accompanying drawings in which.

DEFINITIONS

Figure 1:
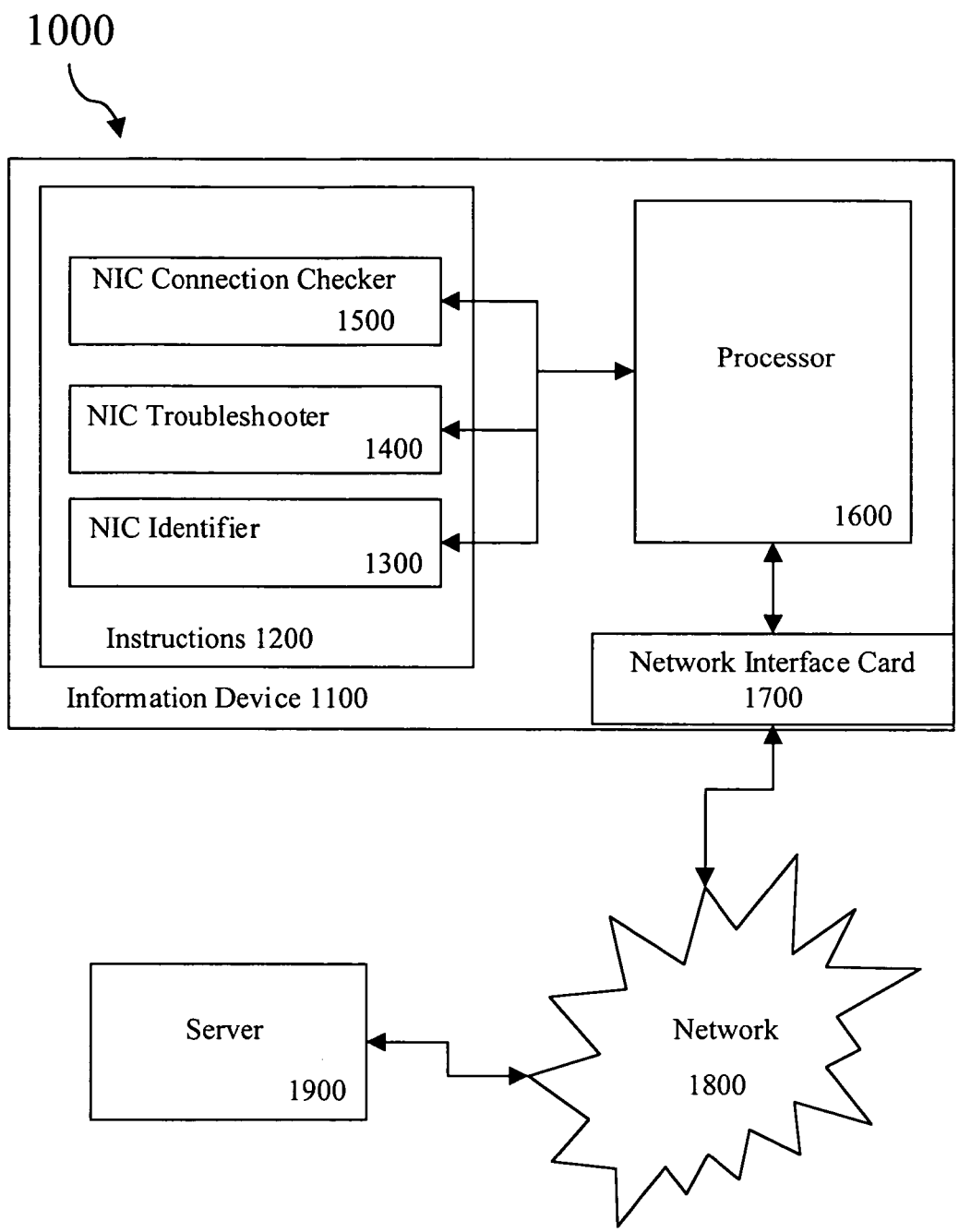
FIG. 1 is a block diagram of an exemplary embodiment of a system 1000.

When the following terms are used herein, the accompanying definitions apply:

accessing—an act of communicating with.

acknowledgement—a response used to indicate that a transmitted message was received uncorrupted or without errors or that a receiving station is ready to accept transmissions.

automatically—acting or operating in a manner essentially independent of external influence or control. For example, an automatic light switch can turn on upon "seeing" a person in its view, without the person manually operating the light switch.

compatible—the ability of one device or program to work with another device or program.

connection—a means or channel of communication.

fault—an imperfection, error, or discrepancy.

firmware—machine-readable instructions that are stored in a read-only memory (ROM). ROM's can comprise PROMs and EPROMs.

HTTP (HyperText Transfer Protocol)—the underlying protocol used by the World Wide Web. HTTP defines how Web messages are formatted and transmitted, and what actions Web servers and browsers should take in response to various commands. For example, when you enter a typical URL in your browser, this actually sends an HTTP command to the Web server directing it to fetch and transmit the requested Web page. [alternatives: FTP, ActiveX, Java, JavaScript, etc.]

HTTP Request—an HTTP command directing a Web server to fetch and transmit a requested Web page or other information.

identifying—recognizing or detecting.

information device—any device on which resides a finite state machine capable of implementing at least a portion of a method, structure, and/or or graphical user interface described herein. An information device can include well-known components such as one or more network interfaces, one or more processors, one or more memories containing instructions, and/or one or more input/output (I/O) devices. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

installed—to connect or set in position and prepare for use.

interface—(n.) a boundary across which two independent systems meet and act on or communicate with each other. (v.) to connect with or interact with by means of an interface.

IP (Internet Protocol)—a network protocol that specifies the format of packets, also called datagrams, and the addressing scheme for the packets. By itself, IP is a protocol for providing a message from a source to a network, but does not establish a direct link between the source and the destination. TCP/IP, on the other hand, can establish a connection between two communicators so that they can send messages back and forth for a period of time.

message—a communication.

network—a communicatively coupled plurality of communication devices.

network interface card (NIC)—an expansion board installable into an information device and adaptable to connect the information device to a network.

proprietary—exclusive; targeting a particular recipient.

protocol-compatible—the ability of a protocol of one device or program to work with a protocol of another device or program. Exemplary protocols include ethernet, IP, TCP, HTTP, etc.

server—a computer or device on a network that manages network resources.

system board—a main circuit board of a computer.

setting—a condition and/or value of a parameter and/or variable.

TCP (Transmission Control Protocol)—a protocol that can establish a virtual connection between a destination and a source.

trouble-shooting—the act of determining and settling problems.

DETAILED DESCRIPTION

FIG. 1 is a block diagram of an exemplary embodiment of a system 1000. In certain exemplary embodiments, system 1000 can comprise an information device 1100. In certain exemplary embodiments, information device 1100 can comprise a processor 1600. In certain exemplary embodiments, processor 1600 can act as an interface between other functional components comprised in information device 1100. Processor 1600 can be adaptable for use in configuring components comprised in information device 1100.

In certain exemplary embodiments, information device 1100 can comprise a NIC 1700, which can be adaptable to communicatively couple information device 1100 to a network 1800 and/or devices thereon. In certain exemplary embodiments, NIC 1700 can be intrinsic to a system board of information device 1100. In certain exemplary embodiments, NIC 1700 can comprise a separate hardware element, such as a card or printed circuit board, adaptable for insertion, for example, in a SCSI, PCI, ISA, and/or EISA interface, etc.

Devices on network 1800 can comprise, for example, information devices, file servers, print servers, web servers, printers, database servers, routers, switches, hubs, and/or gateways, etc. Information device 1100 can comprise any number of NICs 1700 installed for accessing a plurality of networks 1800, such as for example, a broadband network, a wireless home/office network, and/or a local wired network, etc. In certain exemplary embodiments, any of a number of NIC configuration deficiencies can prevent using NIC 1700 to access target network 1800 and/or devices thereon. Sending a technician to configure, troubleshoot, and/or resolve the configuration deficiencies can be undesirable due to expense, delay, and/or inconvenience to a user.

In certain exemplary embodiments, information device 1100 can comprise instructions 1200. In certain exemplary embodiments, instructions 1200 can comprise a NIC identifier 1300, NIC troubleshooter 1400, and/or NIC connection checker 1500. In certain exemplary embodiments, NIC identifier 1300, NIC troubleshooter 1400, and/or NIC connection checker 1500 can be installed on information device 1100 and can automatically determine if information device 1100 is ready to connect with and access network 1800 and/or devices thereon (e.g., of a service provider) using NIC 1700. In certain exemplary embodiments, NIC identifier 1300, NIC troubleshooter 1400, and/or NIC connection checker 1500 can automatically configure information device 1100 to be communicatively couplable to network 1800 and/or devices thereon. In certain exemplary embodiments, NIC identifier 1300, NIC troubleshooter 1400, and/or NIC connection checker 1500 can maintain information device 1100 and/or NIC 1700, once couplability is achieved, to ensure the continued availability of access through NIC 1700 to other devices on target network 1800.

In certain exemplary embodiments, NIC identifier 1300, NIC troubleshooter 1400, and/or NIC connection checker 1500 can be delivered to information device 1100 with an address, such as a domain (e.g., sas.serviceprovider.net), of target network 1800 programmed into NIC identifier 1300, NIC troubleshooter 1400, and/or NIC connection checker 1500. Upon installation, NIC identifier 1300, NIC troubleshooter 1400, and/or NIC connection checker 1500 can determine how many NICs 1700 are installed in information device 1100.

NIC 1700 can further comprise a server 1900. Server 1900 can be adaptable for use in communicating with NIC 1700 to verify or refute communicative coupling between information device 1100 and other devices on network 1800.

Figure 2:
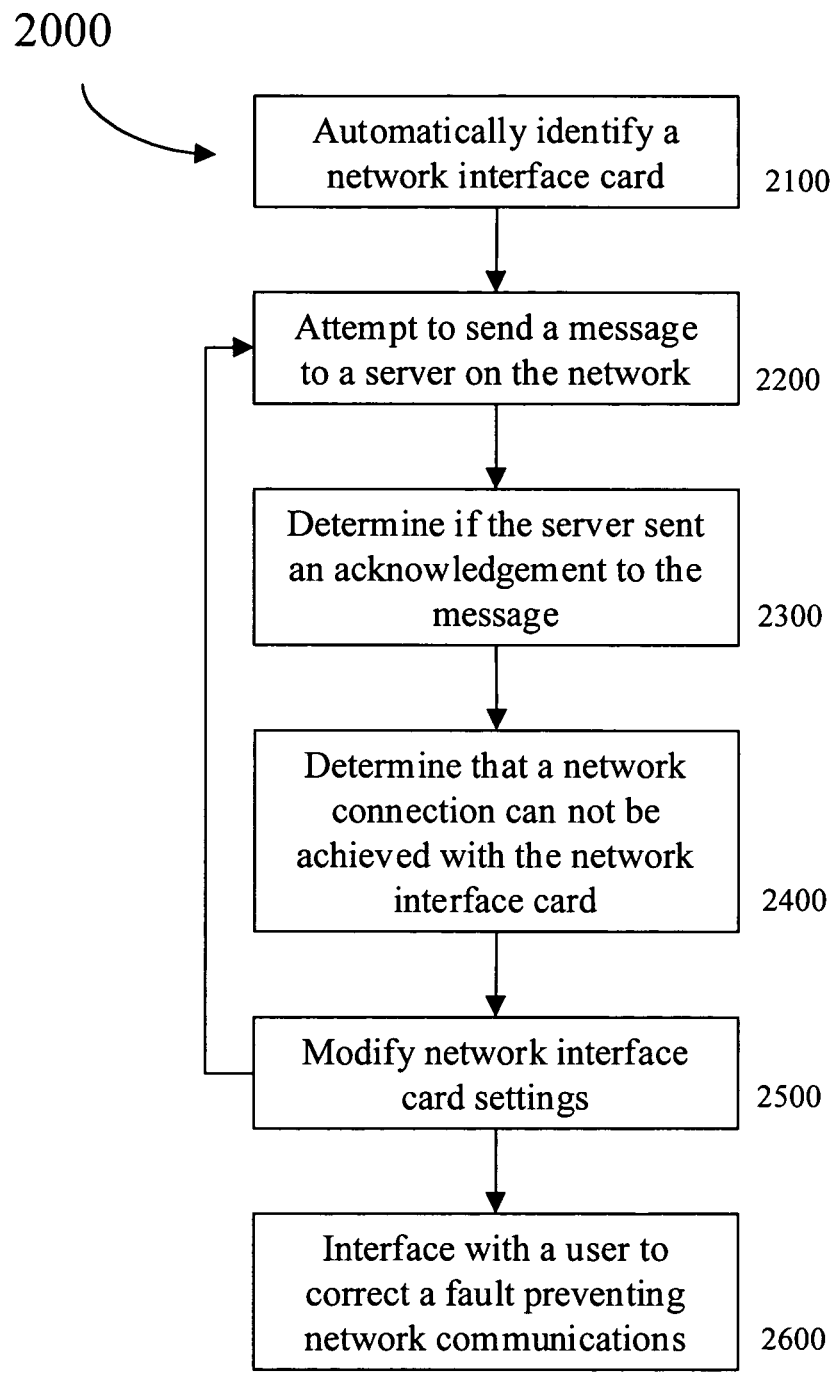
FIG. 2 is a flow diagram of an exemplary embodiment of a method of use 2000 for configuring network interface cards.

FIG. 2 is a flow diagram of an exemplary embodiment of a method of use 2000 for configuring NICs. At activity 2100, a NIC identifier can automatically identify a NIC installed in an information device. Identifying the NIC can allow hardware, firmware, and/or software to further inspect, troubleshoot, and/or configure the NIC. In certain exemplary embodiments, identifying the NIC can comprise obtaining, gathering, and/or storing information and/or settings related to the NIC. Information related to the NIC can comprise, for example, NIC ID, IP address, DHCP status, MAC address, NIC name, and/or cable status, etc. In certain exemplary embodiments, information related to the NIC can comprise whether the NIC is compatible with a target network (e.g., verify that the NIC can couple to an ethernet, is connected to a cable, can see a wireless hub, etc.) and can communicatively couple the information device with other devices on the network.

In certain exemplary embodiments, the identifier can determine if the NIC has correct settings to access the target network and devices connected thereto. Settings can comprise, for example, automatically obtain an IP address or use a static IP address, DNS entries, gateway entries, and/or domain name, etc. In certain exemplary embodiments, if the NIC has incorrect network settings, the connectivity test can be skipped and trouble-shooting can begin.

At activity 2200, an attempt can be made to send a message from the information device comprising the NIC to a server on the network. In certain exemplary embodiments, the message to the server can comprise a proprietary message, and/or a TCP/IP message, such as an HTTP message and/or an HTTP "Connect" request message.

Attempting to send the message from information device comprising the NIC to the server can either confirm or refute the ability of the information device to communicate through the NIC with the server. Attempting to send the message from the information device comprising the NIC to the server can be a step in configuring and/or troubleshooting the ability of the NIC to communicatively couple the information device to other devices on the network.

At activity 2300, a determination can be made if the server sent a proper acknowledgement to the message sent from the information device through the NIC. The acknowledgement from the server can be indicative of whether a communicative coupling exists between the information device comprising the NIC and the server on the network. If a proper acknowledgement is received, the NIC can be classified as correctly configured.

In certain exemplary embodiments, the proper acknowledgement can be an acknowledgement to the proprietary message, the HTTP message, and/or the HTTP Request message sent to the server. In certain exemplary embodiments, the determination can be made that the proper acknowledgement was not received to the proprietary message, the HTTP message, and/or the HTTP Request message sent to the server.

In certain exemplary embodiments, if the NIC does not receive a proper acknowledgement, a trouble-shooting process, such as that described in activities 2400, 2500, and/or 2600, can begin based on any error message returned from the attempt to connect to the server.

At activity 2400, a determination can be made that a connection cannot be achieved between the information device comprising the NIC and other devices on the network. Making a determination that the information device through the NIC cannot achieve a communicative coupling with other devices on the network can be helpful in further troubleshooting, and/or configuring the NIC.

In certain exemplary embodiments, the determination that the connection cannot be achieved can comprise determining if any NIC has correct settings to access the network. Accessing the network can comprise communicatively coupling the information device with at least one device on the network. In certain exemplary embodiments, the determination that the connection cannot be made can comprise selecting a compatible NIC via which to attempt the connection. In certain exemplary embodiments, the determination that the connection cannot be made can comprise interacting with the user to obtain needed NIC settings information. In certain exemplary embodiments, if no NIC settings require changes, the user can be alerted to check cables and/or physical connections coupling the NIC to the network.

At activity 2500, NIC settings can be modified. Modifying NIC settings can correct a condition wherein the NIC is not communicatively coupled to other devices on the network. Proper NIC settings can communicatively couple the information device comprising the NIC to other devices on the network. In certain exemplary embodiments, modifying NIC settings can comprise determining settings to modify for the NIC. In certain exemplary embodiments, modifying NIC settings can comprise modifying predetermined settings for the NIC. In certain exemplary embodiments, activities 2200 and 2300 can be repeated after modifying NIC settings. In certain exemplary embodiments, activities 2200 through 2400 can be repeated after modifying NIC settings.

At activity 2600, an interface can allow a user to provide information. The information provided by the user can be adaptable to correct a fault preventing communications between the information device and other devices on the network. The user can interact with the interface to modify the configuration of the NIC comprised in the information device. Modifying the configuration of the NIC can result in a communicatively coupling of the information device to other devices on the network.

Figure 3:
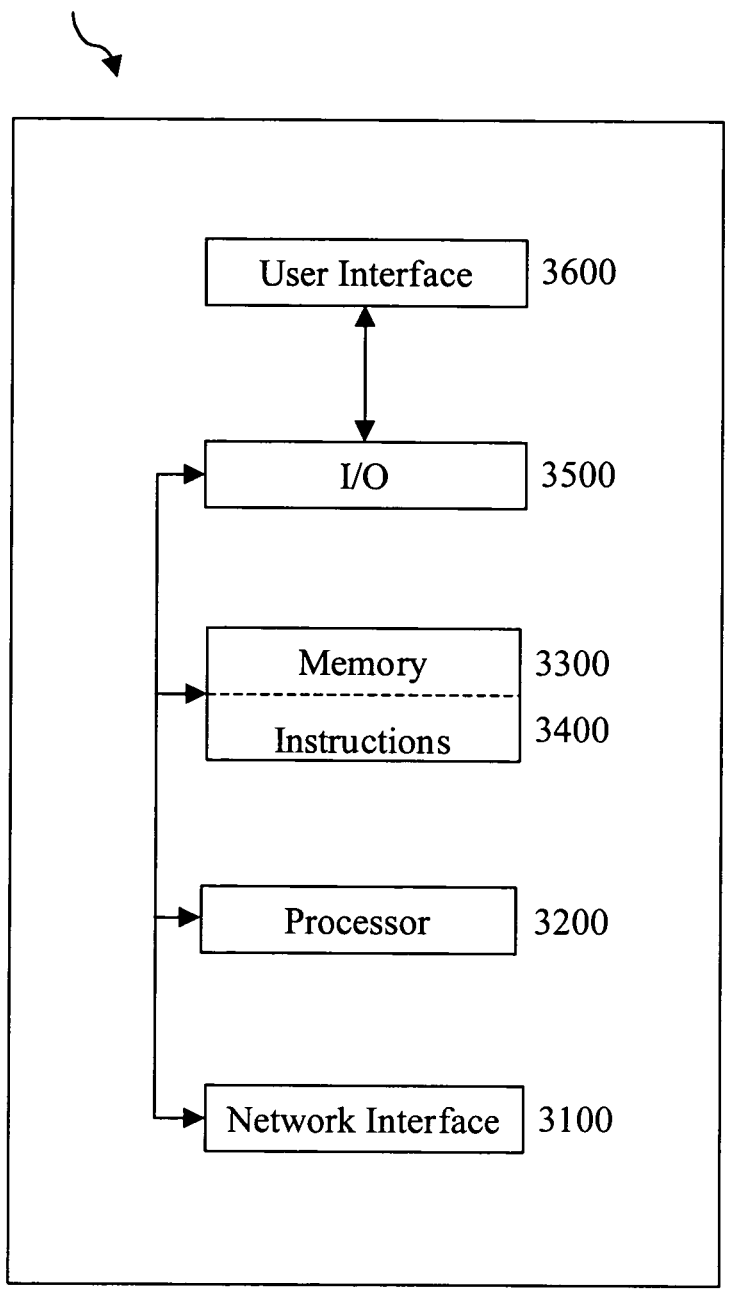
FIG. 3 is a block diagram of an exemplary embodiment of an information device 3000.

FIG. 3 is a block diagram of an exemplary embodiment of an information device 2000, which in certain operative embodiments can comprise, for example, information device 1100 and/or server 1900 of FIG. 1. Information device 3000 can comprise any of numerous well-known components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method, comprising:
receiving a network interface card identifier;
installing the network interface card identifier in an information device after the information device receives the network interface card identifier;
identifying each installed network interface card that is compatible with accessing a predetermined network via the network interface card identifier for the information device, the identifying comprising gathering and storing information related to each installed network interface card, wherein the network interface card identifier determines how many network interface cards are installed in the information device upon installation of the network interface card identifier;
determining that a connection can not be achieved via a selected compatible network interface card to a server on the predetermined network via a connection checker, the connection checker delivered to the information device with a domain address of a target network programmed into the network interface card identifier, the domain address being a uniform resource locator;
wherein the connection checker is configured to attempt to send an hypertext transfer protocol connect message to the server;
wherein the connection checker provides a user interface to a user in response to a determination of a lack of communication of the hypertext transfer protocol connect message to the server;
wherein the user interface is configured to obtain network interface card settings information;
wherein the connection checker configures the selected compatible network interface card to be communicatively couplable to the predetermined network;
trouble-shooting the selected compatible network interface card in response to a determination that a proper acknowledgement to the hypertext transfer protocol connect message has not been received;
classifying the selected compatible network interface card as correctly configured if the proper acknowledgement is received;
interfacing with the user via the user interface to receive configuration modifications for the selected compatible network interface card to communicatively couple the information device to devices in the predetermined network; and
interfacing with the user to correct a fault that prevents accessing the predetermined network, wherein the connection checker alerts the user to check cables and physical connections coupling the network interface card to the predetermined network if no network interface card settings require changes.

2. The method of claim 1, further comprising:
gathering information relating to each network interface card, the information comprising an internet protocol address, a dynamic host control protocol status, a media access control address, an network interface card name, and a cable status; and
verifying that the selected compatible network interface card can see a wireless hub.

3. The method of claim 1, further comprising:
storing information relating to each network interface card, the information comprising whether the network interface card is compatible with the target network, the connection checker adapted to skip a connectivity test if the network interface card is not compatible with the target network.

4. The method of claim 1, further comprising:
storing settings relating to each network interface card, the settings comprising an internet protocol address, domain name service entries, gateway entries, and a domain name, the connection checker adapted to skip a connectivity test if the settings are automatically determined to be incorrect.

5. The method of claim 1, further comprising:
determining if any network interface card has correct settings to access the predetermined network.

6. The method of claim 1, further comprising:
selecting the compatible network interface card.

7. The method of claim 1, further comprising:
attempting to send the hypertext transfer protocol connect message.

8. The method of claim 1, further comprising:
attempting to send an hypertext transfer protocol message to the server.

9. The method of claim 1, further comprising:
attempting to send an hypertext transfer protocol request message to the server.

10. The method of claim 1, further comprising:
determining if a proper acknowledgement was received to a proprietary message sent to the server.

11. The method of claim 1, further comprising:
determining if a proper acknowledgement was received from the server to the hypertext transfer protocol connect message.

12. The method of claim 1, further comprising:
determining if a proper acknowledgement was received from the server to an hypertext transfer protocol request message.

13. The method of claim 1, further comprising:
determining that a proper acknowledgement was not received to a proprietary message sent to the server.

14. The method of claim 1, further comprising:
determining that a proper acknowledgement was not received from the server to the hypertext transfer protocol connect message.

15. The method of claim 1, further comprising:
determining that a proper acknowledgement was not received from the server to an hypertext transfer protocol request message.

16. The method of claim 1, further comprising:
determining settings to modify for the selected compatible network interface card.

17. The method of claim 1, further comprising:
modifying predetermined settings for the selected compatible network interface card.

18. A machine memory comprising machine-implementable instructions for activities comprising:
receiving a network interface card identifier;
installing the network interface card identifier in an information device after the information device receives the network interface card identifier;
identifying each installed network interface card that is compatible with accessing a predetermined network via the network interface card identifier of the information device, the identifying comprising gathering and storing information related to each installed network interface card, wherein the network interface card identifier determines how many network interface cards are installed in the information device upon installation of the network interface card identifier;
determining that a connection can not be achieved via a selected compatible network interface card to a server on the predetermined network via a connection checker, wherein the connection checker is delivered to the information device with a domain address of a target network programmed into the network interface card identifier;
wherein the connection checker is configured to attempt to send an hypertext transfer protocol connect message to the server;
wherein the connection checker provides a user interface to a user in response to a determination of a lack of communication of the hypertext transfer protocol connect message to the server;
wherein the user interface is configured to obtain network interface card settings information;
wherein the connection checker configures the selected compatible network interface card to be communicatively couplable to the predetermined network;
trouble-shooting the selected compatible network interface card in response to a determination that a proper acknowledgement to the hypertext transfer protocol connect message has not been received;
classifying the selected compatible network interface card as correctly configured if the proper acknowledgement is received;
interfacing with the user via the user interface to receive configuration modifications for the selected compatible network interface card to communicatively couple the information device to devices in the predetermined network; and
interfacing with the user to correct a fault that prevents accessing the predetermined network, wherein the connection checker alerts the user to check cables and physical connections coupling the network interface card to the predetermined network if no network interface card settings require changes.

19. A computer-based system comprising:
an information device comprising at least one network interface card;
the information device receiving a network interface card identifier;
installing the network interface card identifier in an information device after the information device receives the network interface card identifier;
the network interface card identifier automatically identifies each installed network interface card that is compatible with accessing a predetermined network, the identifying comprising gathering and storing information related to each installed network interface card, the network interface card identifier determines how many network interface cards are installed in the information device upon installation of the network interface card identifier;
a connection checker automatically determines that a connection can not be achieved via a selected compatible network interface card to a server on the predetermined network, wherein the connection checker is delivered to the information device with a domain address of a target network programmed into the network interface card identifier;
wherein the connection checker is configured to attempt to send an hypertext transfer protocol connect message to the server;
wherein the connection checker provides a user interface to a user in response to a determination of a lack of communication of the hypertext transfer protocol connect message to the server, wherein the user interface is configured to obtain network interface card settings information;
wherein the connection checker interfaces with the user via the user interface to receive configuration modifications for the selected compatible network interface card to communicatively couple the information device to devices in the predetermined network;
wherein the connection checker automatically configures the selected compatible network interface card to be communicatively couplable to the predetermined network;
wherein the connection checker alerts the user to check cables and physical connections coupling the network interface card to the predetermined network if no network interface card settings require changes; and
wherein the user interfaces with the system to correct a fault that prevents accessing the predetermined network; and
a trouble-shooter, responsive to a determination that a proper acknowledgment to the hypertext transfer protocol connect message has not been received, trouble-shooting the selected compatible network interface card, wherein the selected compatible network interface card is classified as correctly configured if the proper acknowledgement is received.

\* \* \* \* \*